Dec. 12, 1944.　　　J. F. RAKOS　　　2,365,107
PROTECTIVE SHIELD FOR WELDERS
Filed March 17, 1944　　　2 Sheets-Sheet 1
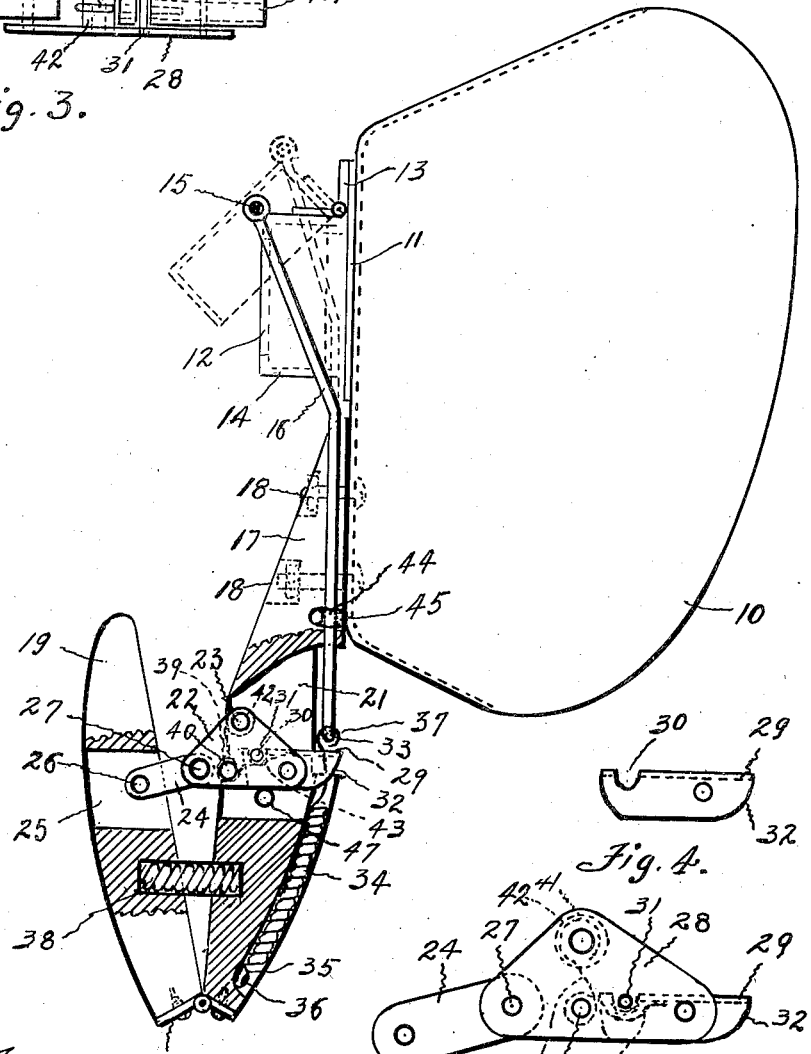
INVENTOR.
Joseph F. Rakos.
BY Lawler & Lawler
Attys.

Patented Dec. 12, 1944

2,365,107

UNITED STATES PATENT OFFICE 2,365,107

PROTECTIVE SHIELD FOR WELDERS

Joseph F. Rakos, Cleveland, Ohio, assignor of one-half to John W. Nelson, Cleveland, Ohio Application March 17, 1944, Serial No. 526,944

1 Claim. (Cl. 2—11)

This invention relates to improvements in a protective shield to protect the operator's face and eyes from the direct rays of the arc, and which is provided with a glass window which is lifted to provide an opening through which the work may be observed previous to the welding operation.

According to the invention the protective shield is provided with a handle, which on being gripped by the user, the window in which the protective glass is mounted is lifted, leaving an opening through which the work may be observed previous to the welding operation.

A lever member in the handle when the handle is gripped, operates to effect the opening of the window carrying the protective medium or glass for the eyes, by forcing a movable member operatively associated with the window vertically upward, thus causing the window that is hinged on or to a frame mounted on the protective shield to open.

With these objects in view the invention consists in certain novel constructions, combination and arrangement of parts hereinafter described and claimed, the advantages of which will be obvious to those skilled in the art from the following description.

The various features of the invention will be clearly understood from the following detailed description and the accompanying drawings in which:

Figure 1 is a view in side elevation of the protective shield comprising the device embodying my invention, portions being broken away. The position of the window when opened being indicated in dotted lines.

Figure 2 is a detail side view of the lever mechanism.

Figure 3 is a plan view of Figure 2.

Figure 4 is a side view of finger which is pivoted in the free end of the bell crank lever.

Figure 5 is a plan view of Figure 4.

Figure 6:
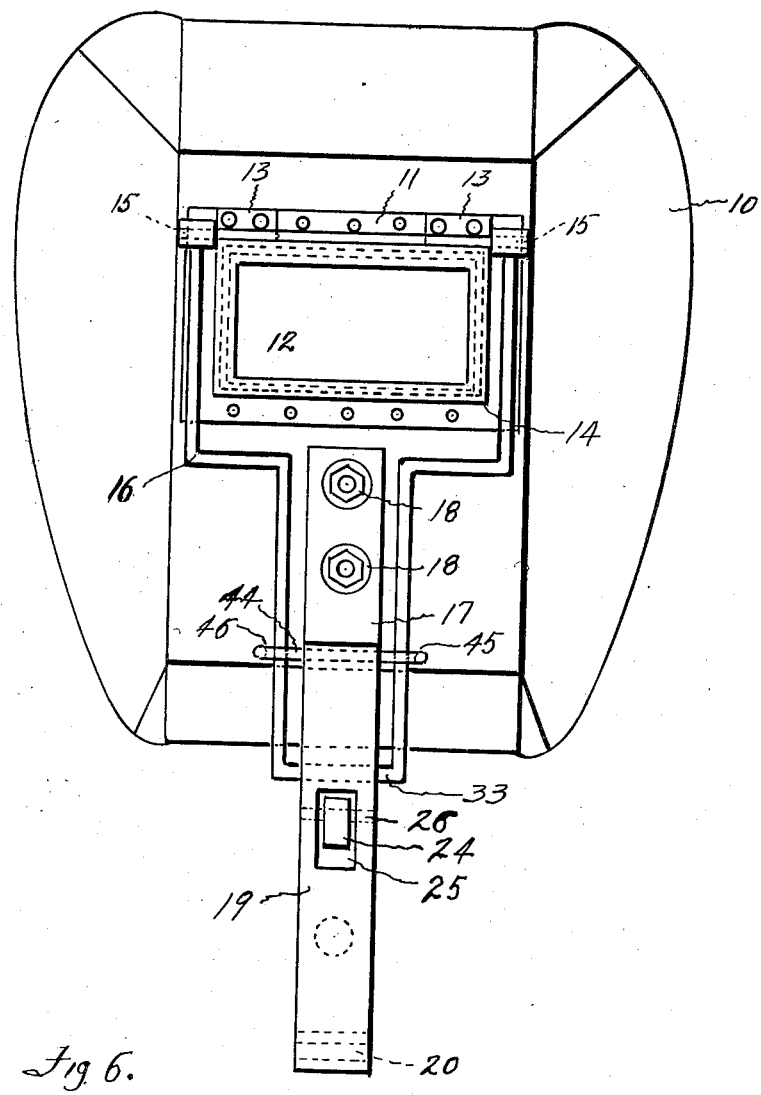
Figure 6 is a front view shown in elevation of the view shown in Figure 1.

Referring to the drawings, in which like reference characters indicate the same parts throughout, 10 indicates a protective shield adapted to protect the operator's face and eyes from the direct rays of the arc. The shield is constructed of some kind of pressed fibre insulating material, and is dead black in color to reduce reflection. The shield is light in weight and is designed and constructed to insure the greatest possible comfort to the welder or user.

Mounted on the shield and secured thereto in a suitable manner is a metal frame 11. The aforesaid frame provides a foundation for the window 12 which is hinged thereto as at 13, 13, and is so constructed that the frame 14 of the window 12 fits over it in such a manner as to exclude the direct rays of the welding arc getting through into the interior of the protective shield, when the window is closed.

In the frame of the window there is removably mounted, the glass, of such composition as to absorb the infra-red rays, and the ultra violet rays and most visible rays emanating from the arc. The window at its top edge is provided with laterally projecting pins 15, 15, on which the bifurcated window lifting member 16 is pivoted.

On the shield there is removably mounted a handle 17, held in place by means of bolts 18, 18. On the handle there is hingedly connected a grip portion 19, the connecting hinge is shown at 20. In the handle there is provided a slot 21 in which the bell crank lever 22 is pivoted as at 23. A link 24 is pivoted in the slot 25 in the grip portion as at 26, and has an end thereof pivoted to the bell crank as at 27. The bell crank lever consists of two spaced plates 28, 28. In the bell crank, in the end remote from the link there is pivotally mounted a finger member 29. The finger is provided with a notch 30 that engages a fixed shaft 31 in the bell crank. The end 32 of the finger is curved so that it will ride over the transverse portion 33 of the bifurcated window lifting member in its return to neutral position as shown in Figures 1 and 2. In the handle there is provided a coil spring 34, the end 35 of which is fixed in the handle as at 36, its other end being hooked around the transverse portion of the bifurcated member as at 37, see Figure 1. In between the handle and grip portion there is provided a coil spring 38. This spring is adapted to force the grip portion away from the handle when released after being gripped. The finger is held in neutral position as shown in Figures 1 and 2, by a spring 39 which is wound around the shaft 40 fixed in the bell crank. The end 41 of the spring 39 is hooked around a spacer 42 in the bell crank and through which the pivot passes. The other end of the spring engages the under side of the finger as at 43 and holds the finger in neutral position as shown in Figures 1 and 2. A guide member 44 is mounted in the handle portion and it is provided with laterally disposed eyes 45 and 46, adapted to guide the lifting member in its operation. In the handle there is provided a stop shaft 47 to limit the movement of the bell crank in the handle.

The operation of the device is as follows:

The user places the shield over his face, if he wishes to see the work before he starts welding, he grips the handle and grip portion, thereby causing the bell crank with its finger to swing upward against the transverse portion of the bifurcated lifting member, with the result that the window is opened as shown in the dotted lines in Figure 1. When the window is opened, the user may look through the opening directly at the work and place the electrode before starting the welding operation. By forcing the grip, the end of the finger is brought into a tangent relation with the transvers portion of the lifting member, with the result that the finger slips the transverse portion of the window lifting member off its end, thus allowing the spring connected to the window lifting member to act, closing the window with a fast snap. When the grip is released the finger in the bell crank on its return to neutral slips over the transverse portion of the bifurcated window lifting member, and after it has passed it, returns to its neutral position as shown in Figure 1, by means of the spring incorporated in the bell crank for that particular purpose.

While I have herein shown and described a preferred arrangement, it will be readily understood that changes and modifications therein may be found desirable or essential in meeting the various exigencies of use, and I desire to be understood as reserving the right to make any and all such changes or modifications as may be found desirable or essential, in so far as the same may fall within the spirit and scope of the invention as expressed in the accompanying claim when broadly construed.

Having thus described my invention, what I claim is:

A device of the class described, comprising, in combination, a protective shield, a foundation frame connected to the aforesaid shield, a window having a welding glass removably mounted therein hinged at its top to the foundation frame and snugly fitting over it, fixed laterally projecting pins at the top edge of the window, a removably mounted handle on the protective shield having a through slot therein, a grip portion having a slot therein hingedly connected to the handle, a bell crank lever comprising two symmetrically formed spaced plates, a spacer between the plates, a fixed shaft in the bell crank, a pivotally mounted finger in the bell crank lever having a notch adjacent one end adapted to engage the fixed shaft, the end of the finger remote from the notch being curved, a spring mounted in the bell crank and duly functioning to maintain the finger in neutral position and to return the finger to initial position after actuation, the bell crank being pivotally mounted in the slot in the handle, a link member pivoted at one end to the bell crank, its other end being pivotally mounted in the slot in the grip portion, a bifurcated window lifting member positioned externally of the protective shield and having its upper ends pivotally mounted on the laterally projecting pins at the top edge of the window, and having a transverse integral portion adapted to engage the spring controlled finger pivotally mounted in the bell crank, a helical spring mounted in the handle having its lower end connected thereto and its upper end connected to the transverse portion of the window lifting member, a helical spring interposed between the handle on the shield and the grip portion, a stop shaft in the handle to limit the movement of the bell crank in one direction, and a guide member connected to the handle having laterally disposed eyes adapted to guide the movement of the window lifting member on being actuated.

JOSEPH F. RAKOS.